(12) United States Patent
Bao et al.

(10) Patent No.: US 11,175,148 B2
(45) Date of Patent: Nov. 16, 2021

(54) SYSTEMS AND METHODS TO ACCOMMODATE STATE TRANSITIONS IN MAPPING

(71) Applicant: Baidu USA, LLC, Sunnyvale, CA (US)

(72) Inventors: Yingze Bao, Mountain View, CA (US); Mingyu Chen, Santa Clara, CA (US)

(73) Assignee: Baidu USA LLC, Sunnyvale, CA (US)

( * ) Notice: Subject to any disclaimer, the term of this patent is extended or adjusted under 35 U.S.C. 154(b) by 642 days.

(21) Appl. No.: 16/102,638

(22) Filed: Aug. 13, 2018

(65) Prior Publication Data

US 2019/0094028 A1    Mar. 28, 2019

Related U.S. Application Data

(60) Provisional application No. 62/564,831, filed on Sep. 28, 2017.

(51) Int. Cl.
*G06T 7/246* (2017.01)
*G06T 7/73* (2017.01)
*G01C 21/32* (2006.01)

(52) U.S. Cl.
CPC .............. *G01C 21/32* (2013.01); *G06T 7/248* (2017.01); *G06T 7/74* (2017.01); *G06T 2207/30244* (2013.01); *G06T 2207/30252* (2013.01)

(58) Field of Classification Search
CPC ....... G06K 9/00791; G06T 7/20; G06T 7/246; G06T 7/248; G06T 7/70; G06T 7/73; G06T 7/74; G06T 2207/30244; G06T 2207/30252; G01C 21/005; G01C 21/30; G05D 1/0246; G05D 1/0253

See application file for complete search history.

(56) References Cited

U.S. PATENT DOCUMENTS

| | | | |
|---|---|---|---|
| 9,435,911 B2 | 9/2016 | Yu | G01V 8/10 |
| 2009/0154791 A1 | 6/2009 | Yoon et al. | 382/153 |
| 2014/0226864 A1* | 8/2014 | Venkatraman et al. | G01C 21/12 382/107 |
| 2015/0092048 A1 | 4/2015 | Brunner et al. | G06K 9/00671 |
| 2018/0364731 A1* | 12/2018 | Liu et al. | G06T 7/74 |
| 2020/0385116 A1* | 12/2020 | Sabripour et al. | G08G 1/04 |

OTHER PUBLICATIONS

Notice of Allowance and Fee Due dated May 5, 2020, in related U.S. Appl. No. 16/102,642 (10 pgs).

Yousif, et al., "An Overview to Visual Odometry and Visual SLAM: Applications to Mobile Robotics", Intell Ind Syst (2015) 1:289-311. (23pgs).

(Continued)

*Primary Examiner* — Andrew W Johns
(74) *Attorney, Agent, or Firm* — North Weber & Baugh LLP (57) ABSTRACT

Described herein are systems and methods that involve abnormality detection and a carefully designed state machine that assesses whether mapping, such as simultaneous localization and mapping (SLAM) processing, should be skipped for the current image frames, whether relocalization may performed, or whether SLAM processing may be performed. Thus, embodiments allow mapping processing to timely and smoothly switch between different tracking states, and thereby prevent bad tracking status to occur.

21 Claims, 10 Drawing Sheets

(56) References Cited

OTHER PUBLICATIONS

Riisgaard & Blas, "SLAM for Dummies," A Tutorial Approach to Simultaneous Localization and Mapping, vol. 22, pp. 1-127, 2005. (127pgs).
B. Hiebert-Treuer, "An Introduction to Robot SLAM (Simultaneous Localization And Mapping)," 2007. Retrieved from Internet <URL: https://ceit.aut.ac.ir/~shiry/lecture/robotics/Robot%20Navigation/Introduction%20to%20SLAM.pdf>. (75pgs).
Durrant-Whyte et al., "Simultaneous Localization and Mapping: Part I," IEEE Robotics & Automation Magazine, 2006. (10pgs).
Introduction to Mobile Robotics, SLAM:Simultaneous Localization and Mapping, [online], [Retrieved Sep. 5, 2019]. Retrieved from Internet <URL: http://ais.informatik.uni-freiburg.de/teaching/ss09/robotics/slides/j_slam.pdf> (49 pgs).

\* cited by examiner

SYSTEMS AND METHODS TO ACCOMMODATE STATE TRANSITIONS IN MAPPING

CROSS-REFERENCE TO RELATED APPLICATION

This application claims the priority benefit under 35 USC § 119(e) to U.S. Provisional Patent Application No. 62/564,831, filed on 28 Sep. 2017, entitled "SYSTEMS AND METHODS TO ACCOMMODATE STATE TRANSITIONS IN MAPPING", and listing Yingze Bao and Mingyu Chen as inventors. The aforementioned patent document is incorporated by reference herein in its entirety.

BACKGROUND

A. Technical Field

The present disclosure relates generally to systems and methods for improving the process of mapping, particular in simultaneous localization and mapping (SLAM).

B. Background

The rise of robotic system and autonomous system has resulted in a need for such system to be able to find their locations in the real world. This problem is quite complex when the system does not know its location, does not have a mapping of the area in which it is operating, or both. To address this problem, sets of processes, referred to as simultaneous localization and mapping (SLAM), have been developed. SLAM endeavors to have a mobile system, placed at an unknown location in an unknown environment, incrementally build a map of its environment while simultaneously determining its location within this map.

It should be noted that the stability and accuracy of position tracking of the device may greatly vary in a SLAM process due to the mode of motions and the type of environments. A naïve SLAM process will typically fail within a very short period of time and cannot recover from the failure if it cannot account for these factors.

Some SLAM methods attempt to be more robust. For example, some may attempt to detect an abnormality in its velocity. If an abnormality is detected, a bag-of-words model is used to identify the most similar key frames, an estimate of a new pose of the camera is obtained, and the tracking is restarted. However, such approaches have significant shortfalls. For example, they only attempt to recover pose tracking after the failure happens. Such systems do not try to predict failures. Furthermore, the recovery may be performed while a good tracking condition is not met yet; and thus, a bad recovery may be used to bootstrap the following SLAM process, which may lead to totally wrong results.

Accordingly, what is needed are systems and methods that address the problems of how to recover from tracking failures and how to handle the transitions between different conditions.

BRIEF DESCRIPTION OF THE DRAWINGS

References will be made to embodiments of the inventions, examples of which may be illustrated in the accompanying figures. These figures are intended to be illustrative, not limiting. Although the inventions are generally described in the context of these embodiments, it should be understood that it is not intended to limit the scope of the inventions to these particular embodiments. Items in the figures are not to scale.

DETAILED DESCRIPTION OF EMBODIMENTS

In the following description, for purposes of explanation, specific details are set forth in order to provide an understanding of the inventions. It will be apparent, however, to one skilled in the art that the inventions can be practiced without these details. Furthermore, one skilled in the art will recognize that embodiments of the present inventions, described below, may be implemented in a variety of ways, such as a process, an apparatus, a system, a device, or a method on a tangible computer-readable medium.

Components, or modules, shown in diagrams are illustrative of exemplary embodiments of the inventions and are meant to avoid obscuring the inventions. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled"

shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. System Embodiments

In embodiments, aspects of the present patent document may utilize, may include, or may be implemented on one or more information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be or may include a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 1:
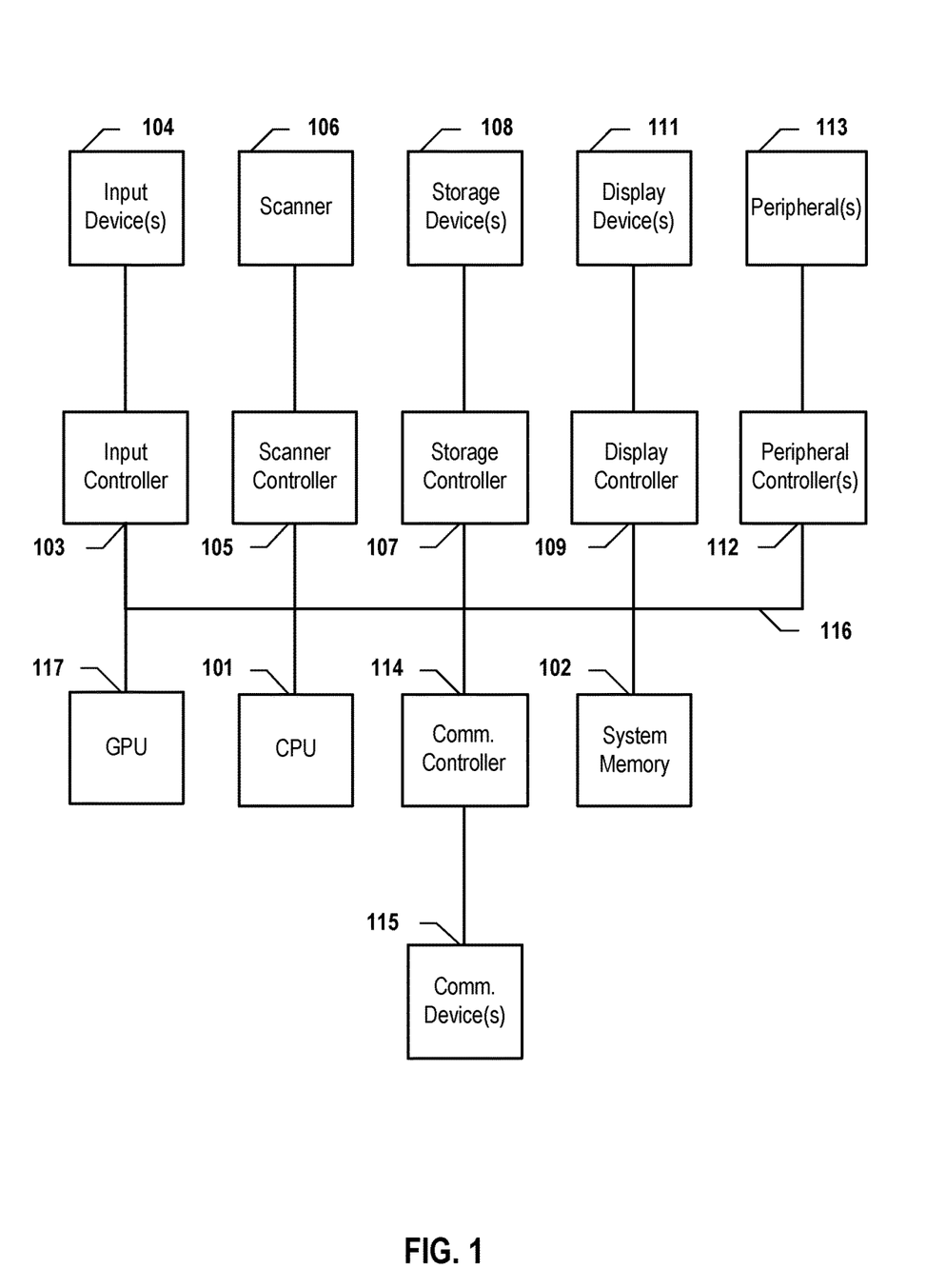
FIG. 1 depicts a simplified block diagram of a computing device/information handling system, in accordance with embodiments of the present document.

FIG. 1 depicts a simplified block diagram of a computing device/information handling system (or computing system) according to embodiments of the present disclosure. It will be understood that the functionalities shown for system 100 may operate to support various embodiments of a computing system—although it shall be understood that an information handling system may be differently configured and include different components, including fewer or more components depicted in FIG. 1.

As illustrated in FIG. 1, system 100 includes one or more central processing units (CPU) 101 that provides computing resources and controls the computer. CPU 101 may be implemented with a microprocessor or the like, and may also include one or more graphics processing units (GPU) 117 and/or a floating-point coprocessor for mathematical computations. System 100 may also include a system memory 102, which may be in the form of random-access memory (RAM), read-only memory (ROM), or both.

A number of controllers and peripheral devices may also be provided, as shown in FIG. 1. An input controller 103 represents an interface to various input device(s) 104, such as a keyboard, mouse, or stylus. There may also be a scanner controller 105, which communicates with a scanner 106. System 100 may also include a storage controller 107 for interfacing with one or more storage devices 108 each of which includes a storage medium such as magnetic tape or disk, or an optical medium that might be used to record programs of instructions for operating systems, utilities, and applications, which may include embodiments of programs that implement various aspects of the present inventions. Storage device(s) 108 may also be used to store processed data or data to be processed in accordance with the inventions. System 100 may also include a display controller 109 for providing an interface to a display device 111, which may be a cathode ray tube (CRT), a thin film transistor (TFT) display, or other type of display. The computing system 100 may also include one or more peripheral controllers or interfaces 112 for one or more peripherals 113. The peripherals may include one or more printers, mobility system (which may include one or more motors, servo units, etc.), inertial measurement units, vision systems (which may include one or more cameras), sensors, etc. A communications controller 114 may interface with one or more communication devices 115, which enables system 100 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 116, which may represent more than one physical bus. However, various system components may or may not be in physical proximity to one another. For example, input data and/or output data may be remotely transmitted from one physical location to another. In addition, programs that implement various aspects of this inventions may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present inventions may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present inventions may further relate to computer products with a non-transitory, tangible computer-readable medium that have computer code thereon for performing various computer-implemented operations. The media and computer code may be those specially designed and constructed for the purposes of the present inventions, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present inventions. One skilled in the art will also recognize that a number of the elements described above may be physically and/or functionally separated into sub-modules or combined together.

1. General Overview

Depicted herein are systems and methods that include abnormality detection and a carefully designed state machine to help with mapping, such as simultaneous localization and mapping (SLAM) determination. In embodiments, the systems and methods allow a SLAM processor to timely and smoothly switch between different tracking states—thereby preventing bad tracking status to occur.

Figure 2:
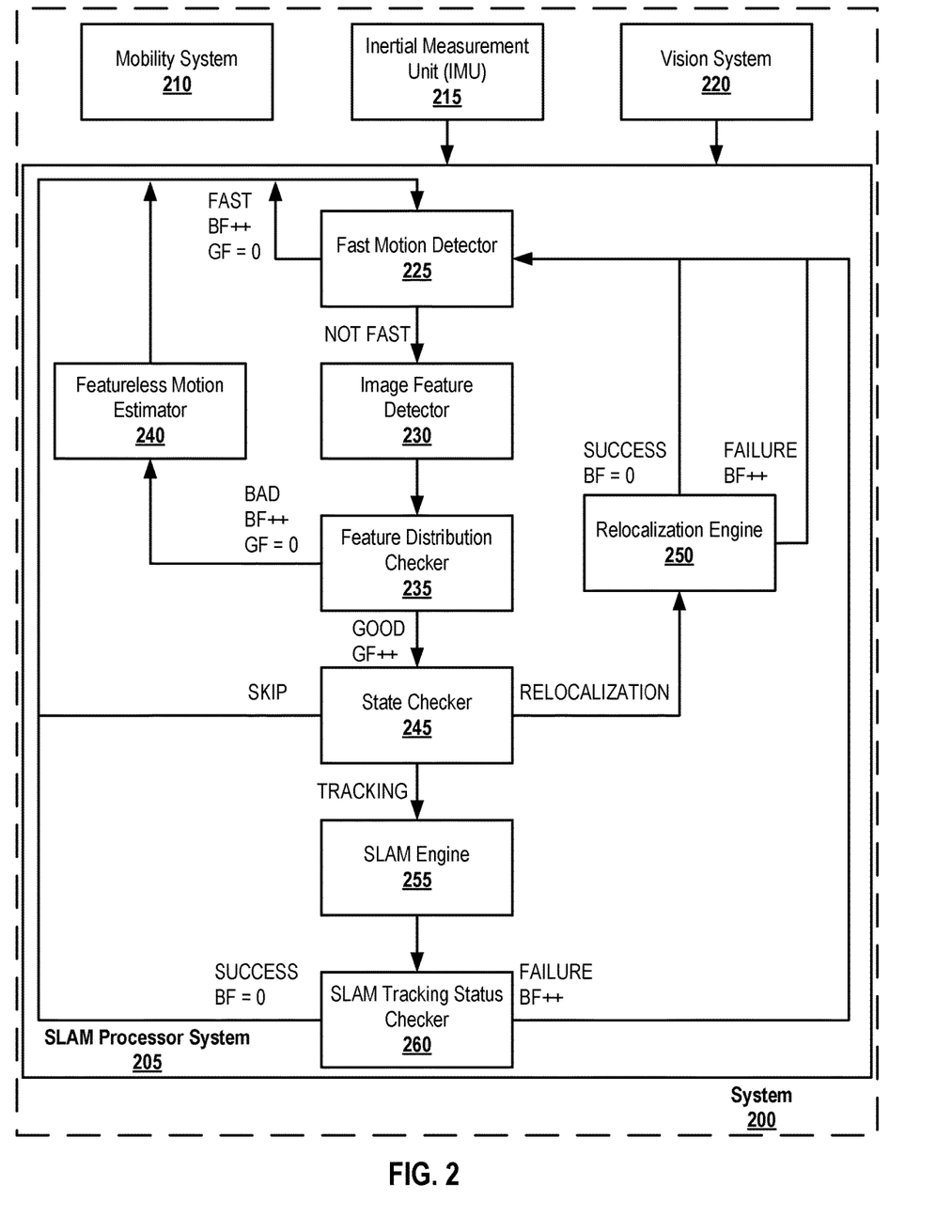
FIG. 2 includes a depiction of a simplified block diagram of a system that includes a simultaneous localization and mapping (SLAM) processor system, according to embodiments of the present document.

FIG. 2 includes a depiction of a simultaneous localization and mapping (SLAM) processor system, according to embodiments of the present document. As shown in FIG. 2, the SLAM processor system 205 may be part of a larger system 200, such as a robotics system, autonomous vehicle, or other similar system. In embodiments, the system may comprise one or more computing systems, or portions thereof, as described with respect to FIG. 1, above. As depicted in FIG. 2, the system 200 may also include a mobility system 210, an inertial measurement unit (IMU) 215, and a vision system (220). It should be noted that system 200 may include additional components, which are not depicted here to avoid obscuring aspects of the present inventions.

In embodiments, the mobility system 210 may include one or more motors, servo units, and/or other systems that facilitate motion of the system 200. In embodiment, the mobility system may include or may be communicatively coupled to a processor system, which controls motion of the system via the mobility system 210. Such systems are well known to those of ordinary skill in the art, and any of a variety of such systems may be used. It should be noted that, in embodiments, the system 200 may not include a mobility system. For example, the system may be incorporated into a mobile device, such as tablet computer, smartphone, or laptop, that does not have a mobility system but rather relies upon the user or some other conveyance mechanism or force.

In embodiments, the inertial measurement unit (IMU) 215 may include one or more gyroscopes, accelerometers, or other motion-detecting or motion-measuring devices that collect data regarding the orientation, speed, velocity, and/or acceleration of the system 200. Such systems are well known to those of ordinary skill in the art, and any of a variety of such systems may be used. It shall be noted that motion measurement data may be collected in or along several axes. As is well known to those of ordinary skill in the art, measurement data related to motion of the system may be beneficially used to help determine the position and/or orientation of the system 200.

In embodiments, the vision system 220 may include one or more cameras, which may take video images, still images, or both. Images may be captured from different angles and may be captured simultaneously, sequential, or both. It shall be understood that the terms "image" or "images" as used herein shall mean still images, video images, or both. Such systems are well known to those of ordinary skill in the art, and any of a variety of such systems may be used. As is also well known to those of ordinary skill in the art, images may be beneficially used to help determine the position and/or orientation of the system 200.

As illustrated in FIG. 2, the SLAM processor system 205 comprises: a fast motion detector 225, an image feature detector 230, a feature distribution checker 235, a featureless motion estimator 240, a state checker 245, a relocalization engine 250, a SLAM engine 255, and a SLAM tracking status checker 260. While FIG. 2 provides a general overview of components of the SLAM processor system 205, the functionality of each components, as well as their overall interactions, are described in more detail below with respect to FIGS. 3-10.

2. Fast Motion Detector Embodiments

Figure 3:
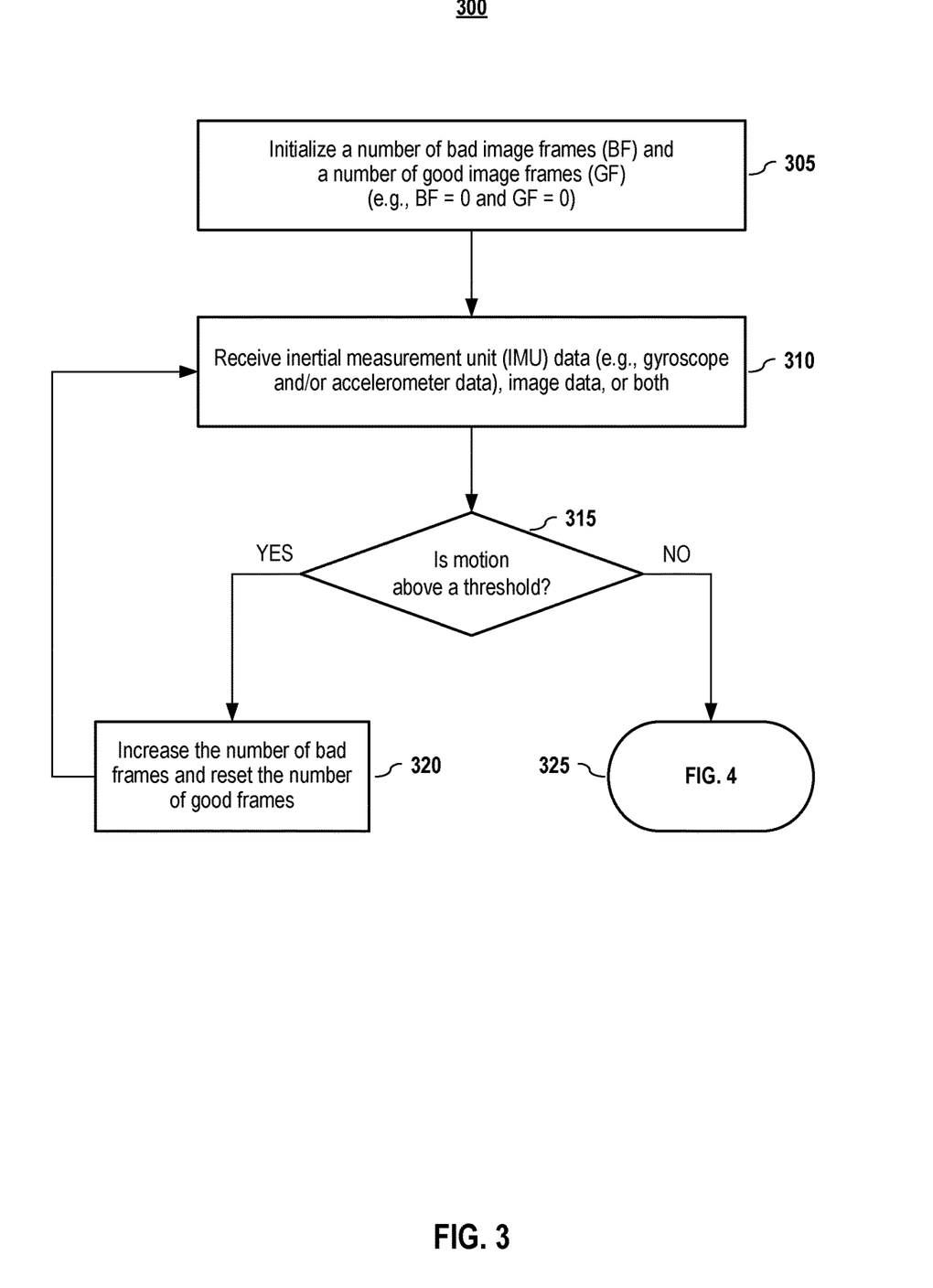
FIG. 3 depicts a method which may be performed, at least in part, by a fast motion detector, according to embodiments of the present document.

FIG. 3 depicts a method which may be performed, at least in part, by a fast motion detector, according to embodiments of the present document. In embodiments, the methodology commences by initializing (305) a number of bad image frames (BF) (e.g., BF=0) and initializing a number of good image frames (GF) (e.g., GF=0). It should be note that the initialization may be done by the fast motion detector 225, may be done by the SLAM processor 205, or the SLAM processor may include an initialization module (not shown) that sets initialized conditions at the start of a new SLAM process.

In embodiments, as shown in FIG. 2, a fast motion detector 225 receives (310) information from the IMU 215 (e.g., gyroscope and/or accelerometer data), from the vision system 220, or from both. This information may be continually received by the fast motion detector 225 or may be received at various time intervals, as a result of a request, as a result of a trigger event, as a result of a push operation, or any combination thereof. This information provided by either or both systems may be used by the fast motion detector 225 to determine (315) whether the system 200 has undergone an abrupt or rapid motion change; that is, a change that is faster than a threshold. Rapid or abrupt movement can be problematic in SLAM evaluation of the system 200. Information provided during a time period of rapid motion may not be beneficial in helping to determine the actual location of the system because, for example, it may take some time for the system to re-orient itself. It should be noted that, in embodiments, different types of motion (e.g., translational, angular, etc.) and/or motion along different directions or axes may trigger classification of the system as having undergone a fast motion. For example, if any one or more detected motions is above a threshold, the fast motion detector may classify the system as being under fast motion.

In embodiments, if the system has, for example: (1) an angular velocity of more than 90° per second; or (2) a standard deviation of acceleration that is higher than three (3) meters per second squared (m/s$^2$), the system may be deemed to have exceeded a threshold limit. Of course, it shall be recognized that other threshold values may be used and that a threshold value may be based upon measurement data capture rate.

In embodiments, image data may be used to determine fast motion. For example, if the image is blurry, then the system may be deemed to have undergone fast motion. Blurriness may be determined, for example, if no features (or fewer than a threshold number of features) are detected in the image (or in a majority of the image). Under such conditions, the system 200 may be classified as having undergone fast motion.

In embodiments, conditions that check both the motion data and the image data may be used to assess whether the system 200 has undergone fast motion. For example, if the motion data exceeds a threshold acceleration rate but the image data is still clear, the system may be deemed to have not undergone fast motion.

If the motion of the system 200 is deemed to have undergone rapid or fast motion, the number of bad image frames is increased (320) and the number of good frames are reset (320). For example, the number of bad image frames may be incremented by one (e.g., BF++), and the number of good image frames may be reset to zero (e.g., GF=0).

If the system 200 is not deemed to have undergone fast motion, the overall methodology may proceed to engage the image feature detector 230. An example method embodiment that may be employed by the image feature detector 230 is depicted in FIG. 4.

3. Image Feature Detector Embodiments

Figure 4:
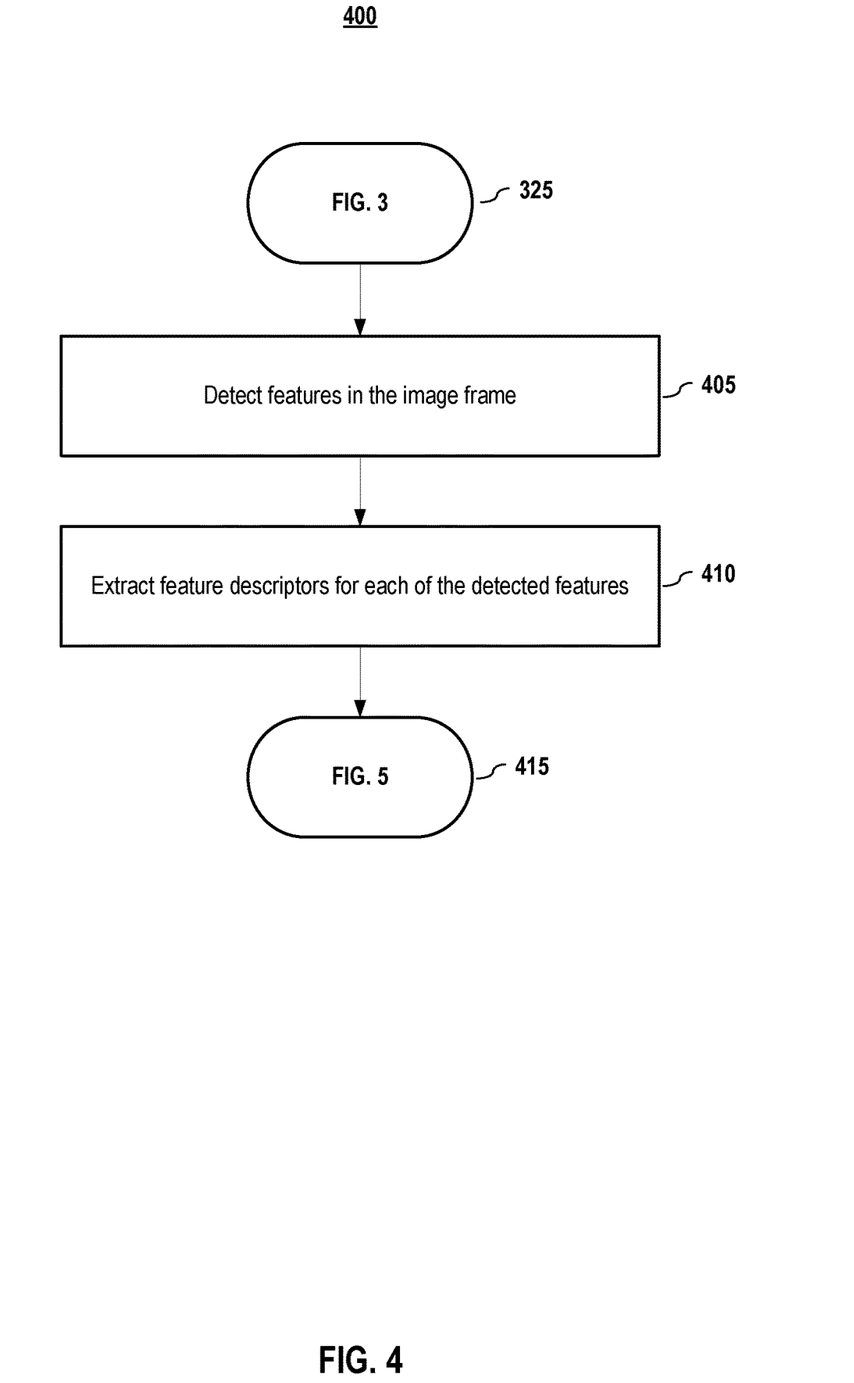
FIG. 4 depicts a method which may be performed, at least in part, by an image feature detector, according to embodiments of the present document.

FIG. 4 depicts a method which may be performed, at least in part, by an image feature detector, according to embodiments of the present document. In embodiments, the image data from the vision system 220 may be supplied directly to the image feature detector 230, may be supplied via the fast motion detector 230, or both. Given a capture image, features may be detected (405) and feature descriptors may be extracted (410) for each of the detected features.

One skilled in the art shall recognize that a number of different methodologies may be employed by the image feature detector 230 to detect and extract image feature descriptors. Examples include, but are not limited to, Oriented FAST and Rotated BRIEF (ORB), Speeded-Up Robust Features (SURF), Scale Invariant Feature Transform (SIFT), Principal Component Analysis SIFT (PCA-SIFT), and Features from Accelerated Segment Test (FAST).

Having extracted a number of feature descriptors, the overall methodology may proceed to engage the feature distribution checker 235. An example method embodiment that may be employed by the feature distribution checker 235 is depicted in FIG. 5.

4. Feature Distribution Checker Embodiments

Figure 5:
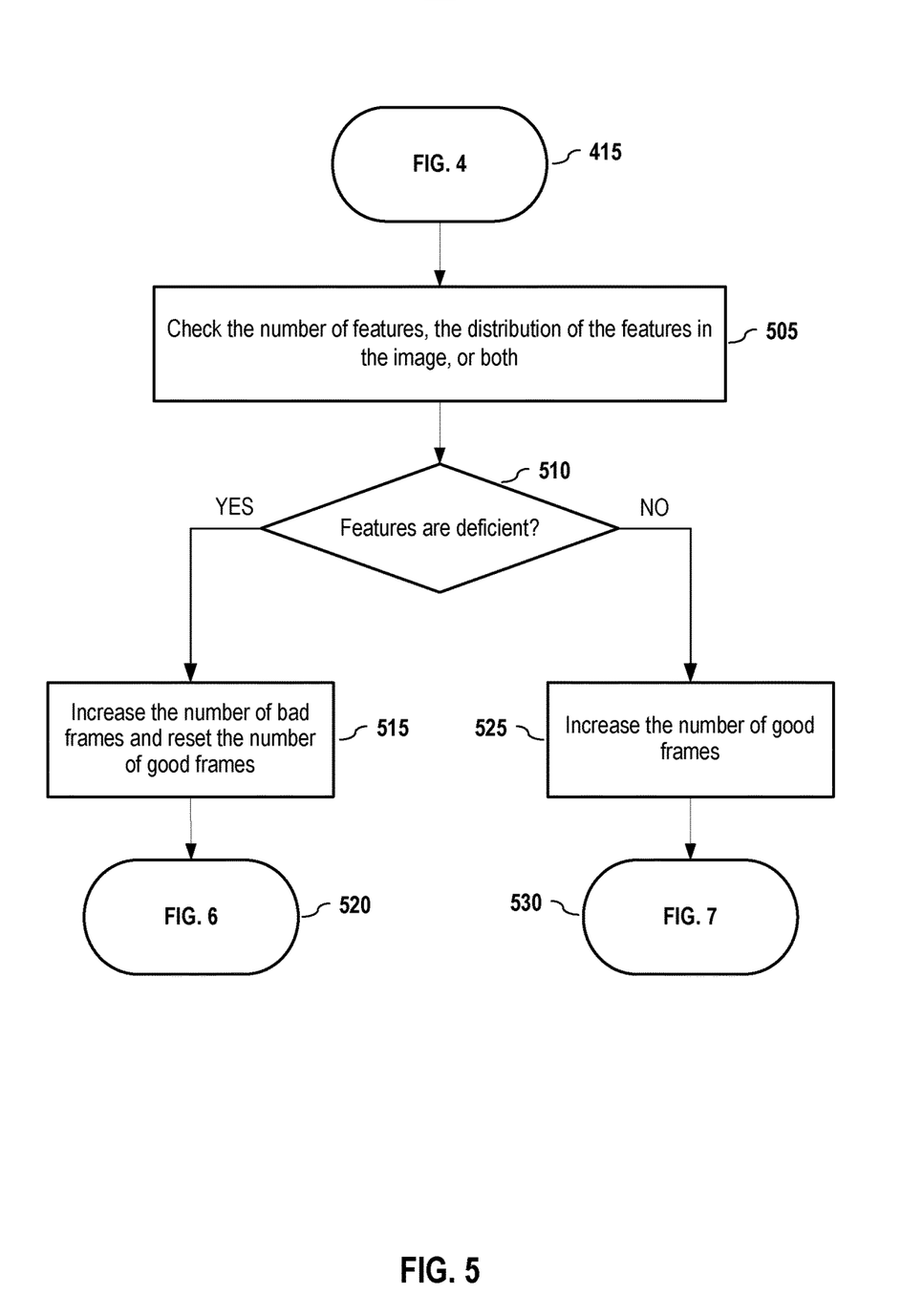
FIG. 5 depicts a method which may be performed, at least in part, by a feature distribution checker module, according to embodiments of the current disclosure.

FIG. 5 depicts a method which may be performed, at least in part, by a feature distribution checker module, according to embodiments of the current disclosure. Given, for an image, the set of feature descriptors and their associated positions within the image, the feature distribution checker 235 may check (510) whether the features are deficient in some way (e.g., the number of features is below a detected features threshold value and/or the distribution of the detected features in the image provides insufficient coverage).

If the number of detected features is less than a threshold (e.g., 10), or if the distribution of the features is skewed (e.g., an outline of the features does not cover more than 30% of the image area), the feature distribution checker may output a "bad" indicator and increase (515) the number of bad frames (e.g., increment the number of bad frames, BF++) and reset the number of good frames (e.g., reset the number of good frames to zero, GF=0). And, in embodiments, the overall methodology may proceed to engage the featureless motion detector 240. An example method embodiment that may be employed by the featureless motion detector 240 is depicted in FIG. 6.

Figure 7:
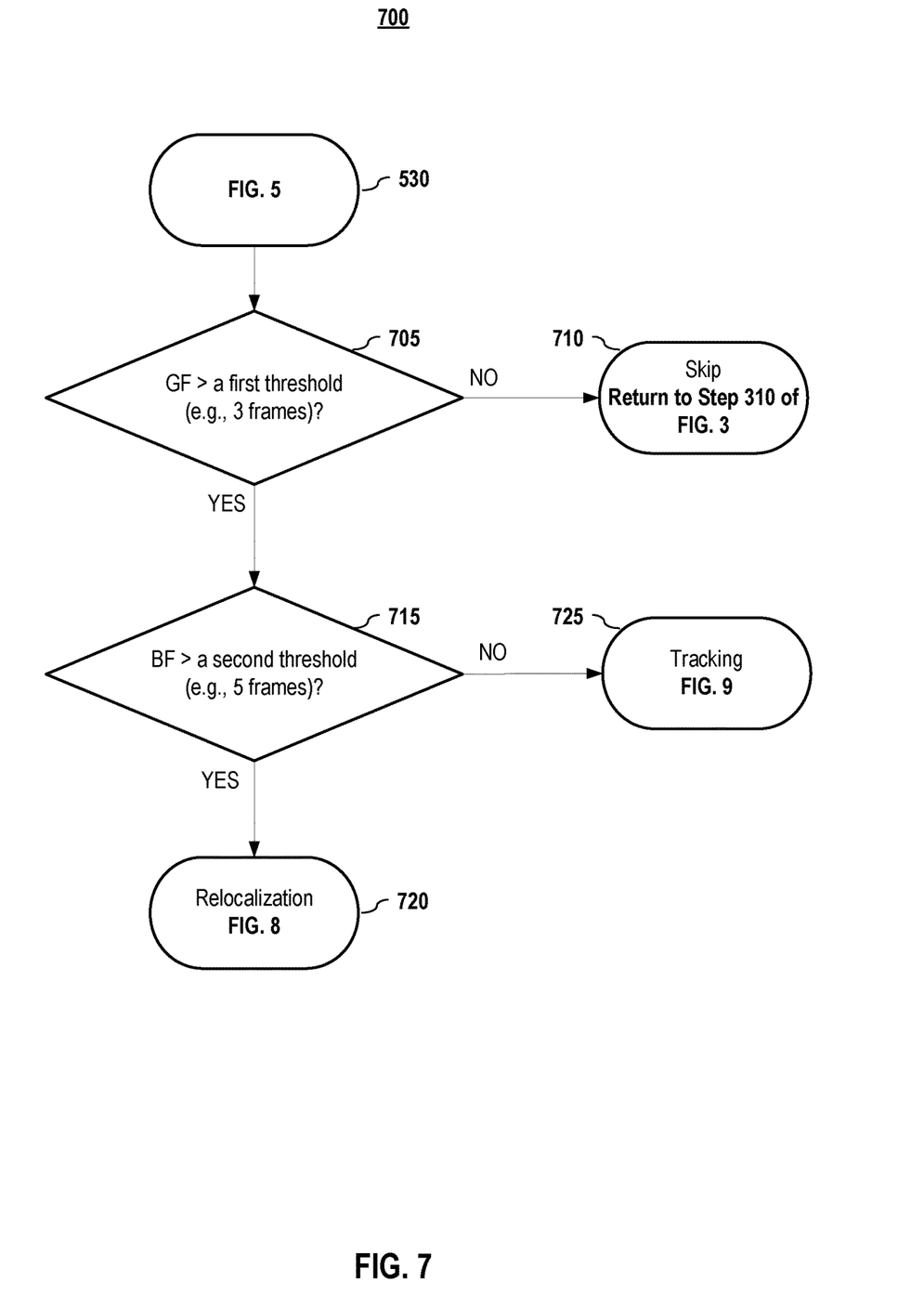
FIG. 7 depicts a method which may be performed, at least in part, by a state checker, according to embodiments of the present disclosure.

If the features are sufficient, the number of good frames are increased (525) (e.g., the number of good frames is incremented, GF++) and overall methodology may proceed (530) to engage the state checker 245. An example method embodiment that may be employed by the state checker 245 is depicted in FIG. 7.

5. Featureless Motion Estimator Embodiments

Figure 6:
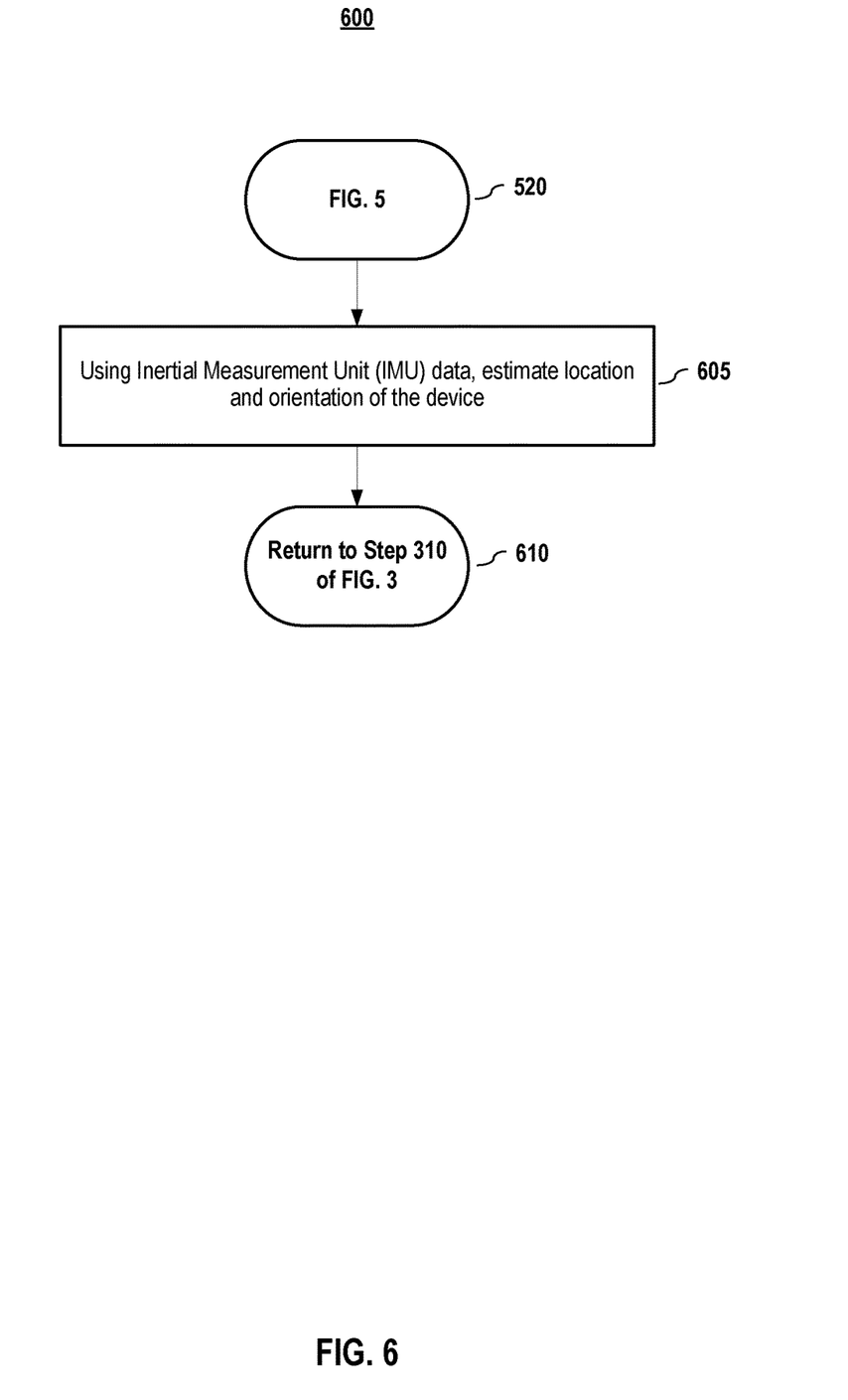
FIG. 6 depicts a method which may be performed, at least in part, by a featureless motion estimator, according to embodiments of the present disclosure.

FIG. 6 depicts a method which may be performed, at least in part, by a featureless motion estimator, according to embodiments of the present disclosure. In embodiments, given that the features for the image were deficient, the SLAM processor system 205 may employ a featureless motion estimator 240 to estimate the location and orientation of the system 200. Thus, in embodiments, using the IMU data, the featureless motion estimator 240 may estimate (605) location and orientation of the system. For example, the featureless motion estimator 240 may use a Runge-Kutta method, such as the RK4 integration, to estimate the location and orientation of the system 200—although other methods may also be employed. Having performed the estimation, the overall process may return (615) to Step 310 of FIG. 3, in which the fast motion detector 225 receives and processes new IMU data, image data, or both.

6. State Checker Embodiments

FIG. 7 depicts a method which may be performed, at least in part, by a state checker 245, according to embodiments of the present disclosure. In embodiments, given sets of feature descriptors for corresponding images, the state checker may determine, based upon the number of good frames and the number of bad frames, how to proceed.

In embodiments, if there are (705) not enough good frames to adequately perform SLAM processing, the process may "skip" trying to estimate location and orientation and continue to gather more good image frames. For example, if the number of good frames is not greater than a good frames threshold (e.g., 3 frames), the overall process may return (710) to Step 310 of FIG. 3, in which the fast motion detector 225 receives and processes new IMU data, image data, or both.

In embodiments, if there are (705) enough good frames, the state checker 245 may check (715) the number of bad frames.

If the number of bad frames is larger than a bad frame threshold (e.g., 5 frames), the state checker assigns a "relocalization" state and transfers processing (720) to the relocalization engine 250. An example method embodiment that may be employed by the relocalization engine 250 is depicted in FIG. 8.

Figure 9:
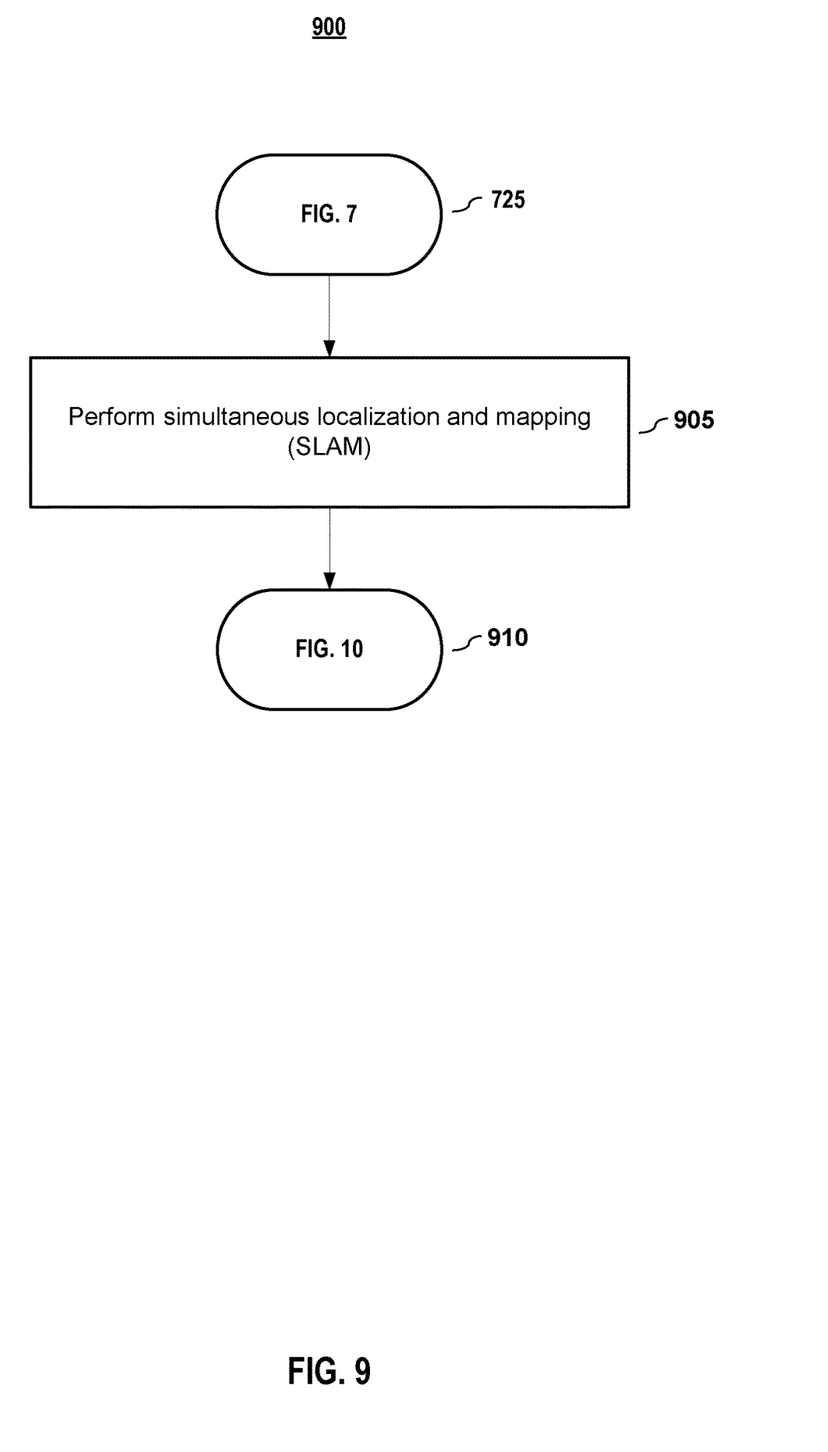
FIG. 9 depicts a method which may be performed, at least in part, by a simultaneous localization and mapping (SLAM) engine, according to embodiments of the present document.

If the number of bad frames is not larger than a bad frame threshold (e.g., 5 frames), the state checker assigns a "tracking" state and transfers processing (725) to the SLAM engine 255. An example method embodiment that may be employed by the SLAM engine 255 is depicted in FIG. 9.

7. Relocalization Engine Embodiments

Figure 8:
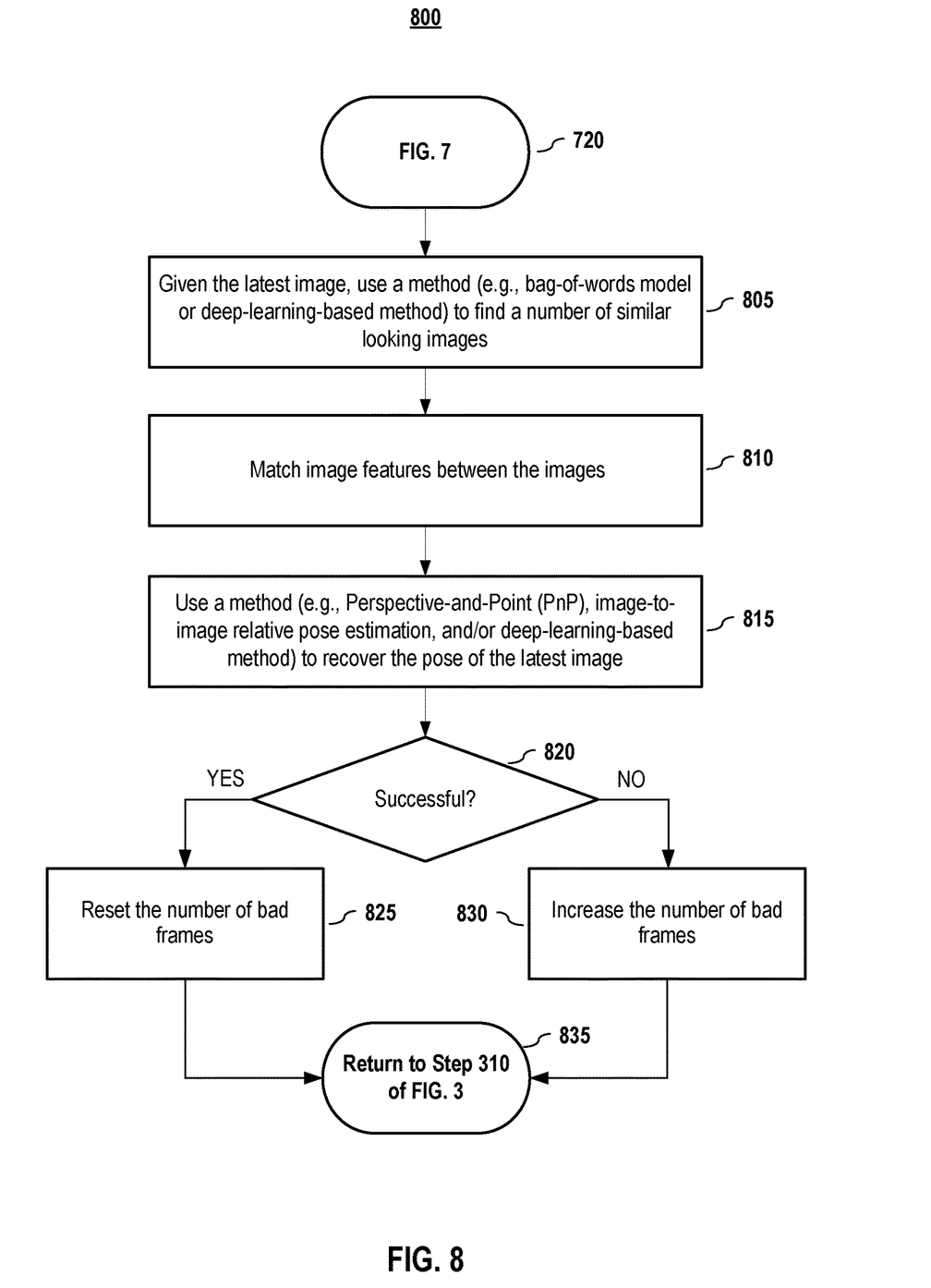
FIG. 8 depicts a method which may be performed, at least in part, by a relocalization engine, according to embodiments of the present document.

FIG. 8 depicts a method which may be performed, at least in part, by a relocalization engine, according to embodiments of the present document. Given the latest image, a method, such as a bag-of-words model or deep-learning-based method, may be used to find (805) a number of similar looking images from a set of images previously captured by the system 200. An example method or methods are provided in "Bags of binary words for fast place recognition in image sequences," by Dorian Gálvez-López and Juan D. Tardós in IEEE Transactions on Robotics (T-RO), 28(5): 1188-1197, 10.1109/TRO.2012.2197158, October 2012, which is incorporated by reference herein in its entirety. Having obtained a set of similar images, image features may be matched (810) between the images. In embodiments, image features may be matched by comparing the image feature descriptors, which is well known to those having ordinary skill in the art. Also, examples of image feature descriptor matching are discussed in the article mentioned above in this paragraph, which has been incorporated by reference herein.

Given a set of matched features, a method, such as Perspective-and-Point (PnP), image-to-image relative pose estimation, and/or a deep-learning-based method) may be used (815) to recover the pose of the latest image. An example deep-learning-based method is provided by Alex Kendall, Matthew Grimes, & Roberto Cipolla, in "PoseNet: A Convolutional Network for Real-Time 6-DOF Camera Relocalization," 2015 IEEE International Conference on Computer Vision (ICCV) 2938-2946. 10.1109/ICCV.2015.336 (2015), which is incorporated by reference herein in its entirety.

In embodiments, a check is performed (820) to determine whether a pose was successfully obtained for the latest image. For example, if a PnP approach is used, the successfulness may be determined by checking the number of three-dimensional (3D) points whose image re-reprojection error is smaller than a threshold (e.g., 1 pixel). If the number of such 3D points are more than a threshold (e.g., 30 points), it may be deemed successful. If deep-learning-based method is used, success may be determined as discussed in the PoseNet paper mentioned above.

If a pose was successfully obtained for the latest image, the number of bad frames may be reset (825) (e.g., BF=0), and the overall process may return (835) to Step 310 of FIG. 3, in which the fast motion detector 225 receives and processes new IMU data, image data, or both.

If a pose was not successfully obtained for the latest image, the number of bad frames may be increased (830) (e.g., BF++), and the overall process may return (835) to Step 310 of FIG. 3, in which the fast motion detector 225 receives and processes new IMU data, image data, or both.

8. SLAM Engine Embodiments

FIG. 9 depicts a method which may be performed, at least in part, by a simultaneous localization and mapping (SLAM) engine 255, according to embodiments of the present document. Given enough good image frames, each with a set of features and corresponding feature descriptors, the SLAM engine 255 may perform (905) one or more a simultaneous localization and mapping (SLAM) methods. Examples of SLAM methods include, but are not limited to, Multi-State Constraint Kalman Filter (MSCKF), Open Keyframe-based Visual-Inertial SLAM (OKVIS), Parallel Tracking and Mapping (PTAM), ORB-SLAM, and the like.

In embodiments, the output of the SLAM engine is supplied to the SLAM tracking status checker 260. An example method embodiment that may be employed by the SLAM tracking status checker 260 is depicted in FIG. 10.

9. SLAM Tracking Status Checker Embodiments

Figure 10:
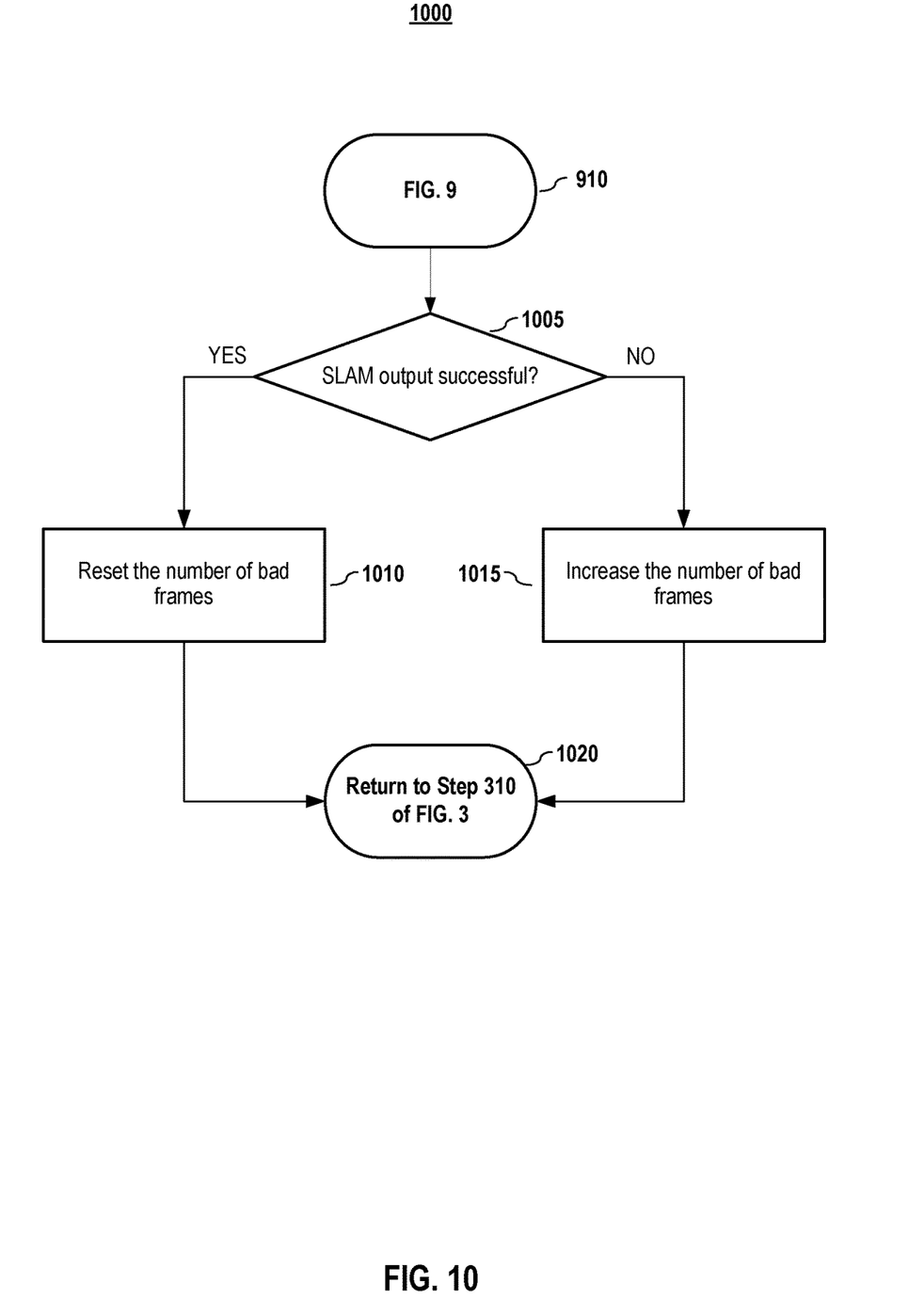
FIG. 10 depicts a method which may be performed, at least in part, by a SLAM tracking status checker, according to embodiments of the present document.

FIG. 10 depicts a method which may be performed, at least in part, by a SLAM tracking status checker, according to embodiments of the present document. In embodiments, the SLAM tracking status checker 260 may check whether one or more conditions have been met or triggered. For example, some SLAM methodologies will, as part of its process, output a flag indicating whether the SLAM method was successful or not. Alternatively, or additionally, the checker 260 may assess whether the velocity of the system 200 is above a threshold (e.g., 5 meters/second). If the SLAM engine failed or if the velocity is above a threshold, the SLAM tracking status checker 260 may assess a "failure" state, and the number of bad frames may be increased (1015) (e.g., BF++), and the overall process may return (1020) to Step 310 of FIG. 3, in which the fast motion detector 225 receives and processes new IMU data, image data, or both.

In embodiments, if the SLAM engine was successful, the number of bad frames may be reset (1010) (e.g., BF=0), and the overall process may return (1020) to Step 310 of FIG. 3.

It will be appreciated to those skilled in the art that the preceding examples provide systems and methods with improved mapping capabilities. In embodiments, the systems and methods allow a SLAM processor to timely and smoothly switch between different tracking states—thereby preventing bad tracking status to occur.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A non-transitory computer-readable medium or media comprising one or more sequences of instructions which, when executed by one or more processors, causes steps for performing localization and mapping of a mobile system comprising:

initializing a number of bad image frames and a number of good image frames to starting values;

receiving image data comprising at least one image frame, motion-related data, or both from one or more sensors of the mobile system;

using the motion-related data, image data, or both to estimate a motion change of the mobile system;
responsive to the motion change not exceeding a rapid motion threshold:
  detecting features in an image frame from the least one image frame;
  extracting feature descriptors for each of the detected features;
  responsive to the detected features not being deficient according to at least one criterion comprising number of detected features or distribution of detected features in an image frame:
    increasing the number of good image frames;
    responsive to the number of good image frames being greater than a first threshold value:
      responsive to the number of bad image frames being greater than a second threshold value, performing tracking of the mobile system; and
      responsive to the number of bad frames not being greater than the second threshold value, performing relocalization of the mobile system.

2. The non-transitory computer-readable medium or media of claim 1 further comprising the steps of:
responsive to the motion change being greater than the rapid motion threshold:
  increasing the number of bad image frames;
  resetting the number of good image frames, if not already at a reset value; and
  returning to the step of receiving image data comprising at least one image frame, motion-related data, or both from one or more sensors of the mobile system.

3. The non-transitory computer-readable medium or media of claim 1 wherein, responsive to the motion change not exceeding the rapid motion threshold, further comprising the steps of:
responsive to the detected features being deficient:
  increasing the number of bad image frames;
  resetting the number of good image frames, if not already at the reset value;
  using motion-related data, estimating location and orientation of the mobile system; and
  returning to the step of receiving image data comprising at least one image frame, motion-related data, or both from one or more sensors of the mobile system.

4. The non-transitory computer-readable medium or media of claim 1 wherein, responsive to the detected features not being deficient according to at least one criterion comprising number of detected features or distribution of detected features in the image frame, further comprising the steps of:
responsive to the number of good image frames not being greater than a first threshold value, returning to the step of receiving image data comprising at least one image frame, motion-related data, or both from one or more sensors of the mobile system.

5. The non-transitory computer-readable medium or media of claim 1 wherein the step of performing tracking of the mobile system comprises:
performing simultaneous localization and mapping of the mobile system;
responsive to simultaneous localization and mapping being successful:
  resetting the number of bad image frames to a reset value, if not already at the reset value; and
  returning to the step of receiving image data comprising at least one image frame, motion-related data, or both from one or more sensors of the mobile system; and
responsive to simultaneous localization and mapping not being successful:
  increasing the number of bad image frames; and
  returning to the step of receiving image data comprising at least one image frame, motion-related data, or both from one or more sensors of the mobile system.

6. The non-transitory computer-readable medium or media of claim 1 wherein the step of performing relocalization of the mobile system comprises:
given a latest image, identifying a number of similar image frames;
performing image feature matching between at least some of the similar image frames;
recovering a pose of the mobile system from the latest image using the matched image features between at least some of the similar image frames;
responsive to successfully recovering the pose:
  resetting the number of bad image frames to a reset value, if not already at the reset value; and
  returning to the step of receiving image data comprising at least one image frame, motion-related data, or both from one or more sensors of the mobile system; and
responsive to not successfully recovering the pose:
  increasing the number of bad frames; and
  returning to the step of receiving image data comprising at least one image frame, motion-related data, or both from one or more sensors of the mobile system.

7. The non-transitory computer-readable medium or media of claim 1 further comprising the steps of:
determining a number of detected features in the image frame; and
responsive to the number of detected features in the image frame being below a detected features threshold number, deeming the detected features as deficient.

8. The non-transitory computer-readable medium or media of claim 1 further comprising the steps of:
determining a distribution of the detected features in the image frame; and
responsive to the distribution of detected features in the image frame being below a distribution threshold value, deeming the detected features as deficient.

9. A processor-implement method for performing localization and mapping of a mobile system, the method comprising:
initializing a number of bad image frames and a number of good image frames to starting values;
receiving image data comprising at least one image frame, motion-related data, or both from one or more sensors of the mobile system;
using the motion-related data, image data, or both to estimate a motion change of the mobile system;
responsive to the motion change not exceeding a rapid motion threshold:
  detecting features in an image frame from the least one image frame;
  extracting feature descriptors for each of the detected features;
  responsive to the detected features not being deficient according to at least one criterion comprising number of detected features or distribution of detected features in an image frame:
    increasing the number of good image frames;

responsive to the number of good image frames being greater than a first threshold value:
responsive to the number of bad image frames being greater than a second threshold value, performing tracking of the mobile system; and
responsive to the number of bad frames not being greater than the second threshold value, performing relocalization of the mobile system.

10. The processor-implemented method of claim 9 further comprising the steps of:
responsive to the motion change being greater than the rapid motion threshold:
increasing the number of bad image frames;
resetting the number of good image frames, if not already at a reset value; and
returning to the step of receiving image data comprising at least one image frame, motion-related data, or both from one or more sensors of the mobile system.

11. The processor-implemented method of claim 9 wherein, responsive to the motion change not exceeding the rapid motion threshold, further comprising the steps of:
responsive to the detected features being deficient:
increasing the number of bad image frames;
resetting the number of good image frames, if not already at the reset value;
using motion-related data, estimating location and orientation of the mobile system; and
returning to the step of receiving image data comprising at least one image frame, motion-related data, or both from one or more sensors of the mobile system.

12. The processor-implemented method of claim 9 wherein, responsive to the detected features not being deficient according to at least one criterion comprising number of detected features or distribution of detected features in the image frame, further comprising the steps of:
responsive to the number of good image frames not being greater than a first threshold value, returning to the step of receiving image data comprising at least one image frame, motion-related data, or both from one or more sensors of the mobile system.

13. The processor-implemented method of claim 9 wherein the step of performing tracking of the mobile system comprises:
performing simultaneous localization and mapping of the mobile system;
responsive to simultaneous localization and mapping being successful:
resetting the number of bad image frames to a reset value, if not already at the reset value; and
returning to the step of receiving image data comprising at least one image frame, motion-related data, or both from one or more sensors of the mobile system; and
responsive to simultaneous localization and mapping not being successful:
increasing the number of bad image frames; and
returning to the step of receiving image data comprising at least one image frame, motion-related data, or both from one or more sensors of the mobile system.

14. The processor-implement method of claim 9 wherein the step of performing relocalization of the mobile system comprises:
given a latest image, identifying a number of similar image frames;
performing image feature matching between at least some of the similar image frames;
recovering a pose of the mobile system from the latest image using the matched image features between at least some of the similar image frames;
responsive to successfully recovering the pose:
resetting the number of bad image frames to a reset value, if not already at the reset value; and
returning to the step of receiving image data comprising at least one image frame, motion-related data, or both from one or more sensors of the mobile system; and
responsive to not successfully recovering the pose:
increasing the number of bad frames; and
returning to the step of receiving image data comprising at least one image frame, motion-related data, or both from one or more sensors of the mobile system.

15. The processor-implement method of claim 9 further comprising the steps of:
determining a number of detected features in the image frame; and
responsive to the number of detected features in the image frame being below a detected features threshold number, deeming the detected features as deficient.

16. The processor-implement method of claim 9 further comprising the steps of:
determining a distribution of the detected features in the image frame; and
responsive to the distribution of detected features in the image frame being below a distribution threshold value, deeming the detected features as deficient.

17. A mobile system for performing localization and mapping of the mobile system comprising:
a vision system for capturing one or more image frames;
one or more sensors for capturing motion-related data;
one or more processors; and
a non-transitory computer-readable medium or media comprising one or more sequences of instructions which, when executed by at least one processor of the one or more processors, causes steps to be performed comprising:
initializing a number of bad image frames and a number of good image frames to starting values;
receiving image data comprising at least one image frame, motion-related data, or both from one or more sensors of the mobile system;
using the motion-related data, image data, or both to estimate a motion change of the mobile system;
responsive to the motion change not exceeding a rapid motion threshold:
detecting features in an image frame from the least one image frame;
extracting feature descriptors for each of the detected features;
responsive to the detected features not being deficient according to at least one criterion comprising number of detected features or distribution of detected features in an image frame:
increasing the number of good image frames;
responsive to the number of good image frames being greater than a first threshold value:
responsive to the number of bad image frames being greater than a second threshold value, performing tracking of the mobile system; and
responsive to the number of bad frames not being greater than the second threshold value, performing relocalization of the mobile system.

18. The mobile system of claim 17 further comprising the steps of:

responsive to the motion change being greater than the rapid motion threshold:
   increasing the number of bad image frames;
   resetting the number of good image frames, if not already at a reset value; and
   returning to the step of receiving image data comprising at least one image frame, motion-related data, or both from one or more sensors of the mobile system.

19. The mobile system of claim 17 wherein, responsive to the motion change not exceeding the rapid motion threshold, further comprising the steps of
   responsive to the number of good image frames not being greater than a first threshold value, returning to the step of receiving image data comprising at least one image frame, motion-related data, or both from one or more sensors of the mobile system.

20. The mobile system of claim 17 wherein the step of performing tracking of the mobile system comprises:
   performing simultaneous localization and mapping of the mobile system;
   responsive to simultaneous localization and mapping being successful:
     resetting the number of bad image frames to a reset value, if not already at the reset value; and
     returning to the step of receiving image data comprising at least one image frame, motion-related data, or both from one or more sensors of the mobile system; and
   responsive to simultaneous localization and mapping not being successful:
     increasing the number of bad image frames; and
     returning to the step of receiving image data comprising at least one image frame, motion-related data, or both from one or more sensors of the mobile system.

21. The mobile system of claim 17 wherein the step of performing relocalization of the mobile system comprises:
   given a latest image, identifying a number of similar image frames;
   performing image feature matching between at least some of the similar image frames;
   recovering a pose of the mobile system from the latest image using the matched image features between at least some of the similar image frames;
   responsive to successfully recovering the pose:
     resetting the number of bad image frames to a reset value, if not already at the reset value; and
     returning to the step of receiving image data comprising at least one image frame, motion-related data, or both from one or more sensors of the mobile system; and
   responsive to not successfully recovering the pose:
     increasing the number of bad frames; and
     returning to the step of receiving image data comprising at least one image frame, motion-related data, or both from one or more sensors of the mobile system.

* * * * *